(12) United States Patent
Gill (10) Patent No.: US 7,850,213 B2
(45) Date of Patent: Dec. 14, 2010

(54) COUPLING WITH CROSSABLE MEANS FOR COUPLINGS TO CONNECT ENDPORTIONS OF PIPES AND VALVES

(76) Inventor: Ajit Singh Gill, 4169 Bennion Rd., Salt Lake City, UT (US) 84119

( * ) Notice: Subject to any disclaimer, the term of this patent is extended or adjusted under 35 U.S.C. 154(b) by 708 days.

(21) Appl. No.: 11/821,685

(22) Filed: Jun. 25, 2007

(65) Prior Publication Data

US 2008/0315580 A1 Dec. 25, 2008

(51) Int. Cl.
*F16L 21/00* (2006.01)

(52) U.S. Cl. .................................... 285/417; 285/383

(58) Field of Classification Search ............... 285/403, 285/404, 383, 313, 312, 417
See application file for complete search history.

(56) References Cited

U.S. PATENT DOCUMENTS

| | | | | |
|---|---|---|---|---|
| 406,397 A | * | 7/1889 | Hampton | 285/66 |
| 1,430,969 A | * | 10/1922 | Fillis | 285/404 |
| 1,535,294 A | * | 4/1925 | Collins | 285/412 |
| 1,834,968 A | * | 12/1931 | Rector | 285/404 |
| 2,079,949 A | * | 5/1937 | Novati | 285/404 |
| 3,223,439 A | * | 12/1965 | Stevens | 285/404 |
| 3,438,658 A | * | 4/1969 | Stevens | 285/404 |
| 2003/0025324 A1 | * | 2/2003 | Guesnon et al. | 285/404 |
| 2007/0085341 A1 | * | 4/2007 | Walmsley et al. | 285/369 |
| 2007/0257488 A1 | * | 11/2007 | Jimenez | 285/404 |

* cited by examiner

*Primary Examiner*—Aaron Dunwoody
(74) *Attorney, Agent, or Firm*—Thorpe North & Western LLP

(57) ABSTRACT

A coupling to connect two pipes, and to connect pipe fittings and valves with pipes, which includes arcuates provided with inner flanges in their end portions, where said arcuates are positioned around crossable inner means, which means can also be used by different types of cylindrical couplings which couplings require grooves around cylindrical rings mounted around the end portions of pipes; where crossable inner means is comprised of a centrally located partitioner ring located between two pipes, which ring separates two gaskets provided with backup rings which backup rings are provided with radial circumferential grooves for the attachment of said arcuates bridging across said inner means. Said backup rings are attachable to the shoulders constructed around the end portions of two opposite pipes.

25 Claims, 9 Drawing Sheets

COUPLING WITH CROSSABLE MEANS FOR COUPLINGS TO CONNECT ENDPORTIONS OF PIPES AND VALVES

BACKGROUND OF THE INVENTION

1. Field

The invention is in the field of pipe couplings to connect pipes, pipe fittings, and valves provided with grooves in their end portions.

2. State of the Art

Currently couplings sold by Victaulic Company of America, Easton, Pa. under the Trade Mark, "VICTAULIC" are used for grooved end pipe, and the company holds numerous U.S. Patents. The Victaulic coupling is generally made of two arcuate pieces, where their ends with inner radial flanges are keyed into (i.e. mounted into) grooves constructed around the end portions of two pipes, to connect the two pipes. First, the pipes are aligned, then a single bridging seal gasket is mounted over the two ends of the aligned pipes held in end-to-end relationship. The inventor of this invention holds a number of patents to connect pipes with the cylindrical couplings. In the case of couplings presently on the market, when the gasket is required to be replaced, at least one link of pipe is pulled out of the pipeline. In the case of large size pipe, the pipe is sawed near the coupling itself, and the cut out piece is replaced by a new stub of pipe having a groove, where a new stub piece is welded to fill the gap left behind by the cutting and removal of the pipe section from the old pipe. The invented coupling, invented with crossable means for the coupling, provides Crossable Means as a unit, which can be used with other cylindrical couplings that require radial grooves around cylindrical backup rings, which cylindrical backup rings are mounted around the end portions of pipes as backup rings for seal gaskets and also to connect the end portions of pipes, or to connect the end portions of valves and fittings to pipes. From here on, the connecting together of two ends of pipes, or the connecting of an end of a valve with an end of a pipe, will be considered one and the same. Crossable means in the invented coupling will be referred to as "Crossable Inner Means" or "Crossable Means" for cylindrical couplings, which means can be crossed among other cylindrcial couplings. It is clear that if Crossable Inner Means can be standardized for use with other cylindrical couplings, the cost to produce such inner means will thereby be reduced, and the overall cost of the couplings will also be reduced due to economy of scale during production. The invented coupling is made with two or more cylindrical arcuate pieces, where each piece is provided with an inner radial flange at each of its two ends. Each said piece is positioned concentrically around a partitioner ring, preferably by means of at least one screw or anchor bolt. Two pipes are connected by keying said radial inner flanges of said arcuates inside of grooves constructed around the end portions of cylindrical backup rings which are mounted around the end portions of said two pipes. The Crossable Means from here on are defined as a set, where the set includes a partitioner ring having at least one or more circumferentially threaded radial hole or holes, so that at least one arcuate piece of the outer body of the coupling, concentric with the partitioner ring, can be attached to the partitioner ring by means of at least one screw or anchor bolt; and where said partitioner ring separates two gaskets, where each said gasket is designed to be seated around the end portion of one of the two pipes being connected by means of the invented coupling, and each gasket is provided with a special cylindrical backup ring, which has an external circumferential groove and an inner radial flange in its front end portion, and, preferably, a 180 degree open ended cylindrical radial groove at its outer end to lock two flat arcuate plates inside of the groove; and the backup ring can be attached to the circumferentially constructed shoulder around the end portion of pipe by positioning said shoulder around pipe between the inner flange of the backup ring and cylindrical arcuate flat plates mounted inside of the inner radial groove at the outer end of the backup ring.

An object of this invention of this coupling is to provide a set of typical Crossable Inner Means for the outer body of the invented coupling, which typical Crossable Inner Means can be used with other cylindrical couplings, and with couplings invented by the inventor under U.S. Pat. No. 6,921,115 B2; U.S. Pat. No. 5,387,017; U.S. Pat. No. 6,186,560 B1, U.S. Pat. No. 5,794,988, to cut cost of production of a set of typical Crossable Inner Means based on economy of scale.

Another object of this invention is to standardize the radial sizes of the typical Crossable Inner Means and their lengths, and enabling other cylindrical crossover couplings to use the invented set of typical crossable Inner Means, which from hereon will be called, Crossable Means.

Another object of this invention is to have Crossable Means, which enable the coupling to be an expansion joint, thus eliminating the need of separate expansion joints for the pipes.

Another object of this invention is to provide auxiliary means for Crossable Means, which can be means to hang the pipe from a structure inside or outside of the building.

Another object of this invention is to makes it easier to mount gaskets around the end portions of pipes and make it easier to replace gaskets when the need rises.

Another object of this invention is to make it easier to connect arcuate pieces of the invented coupling to the end portions of cylindrical backup rings.

Another object of this invention is to provide a spacer partitioner ring having an inner diameter equal to the inner diameter of the two pipes being connected, and equal to the inner diameter of the smaller diameter in the case of reducer fitting, wherein the partitioner ring can be removed when the gasket is needs to be changed.

Another object of the invention is to provide mechanical adjuster assembly (or assemblies) means to adjust the distance between grooves constructed around the cylindrical backup rings, so as to provide the proper distance.

Another object of this invention is to provide cylindrical backup rings, where each said backup ring can be provided with a locking ring to lock the end flanges of arcuates inside the grooves provided circumferentially around said backup rings.

Another object of this invention is to provide a partitioner ring with radial threaded holes to attach bridging arcuates between backup rings by means of screws or anchor bolts, where said radial holes may serve as means to attach a temporary angle bolt or T bolts to mount the partitioner ring into the opening of the monolithic cylindrical coupling, or to dismount the partitioner ring there from, when the seal gasket is replaced.

SUMMARY OF INVENTION

According to the invention, a coupling to connect the ends of two pipes 1 and 1A, includes at least two cylindrical arcuate pieces A1 and A2 (provided with inner radial flanges F1 and F2 at their ends) positioned around a centrically located partitioner ring 12, two seal gaskets 8 and 9 separated by said partitioner ring 12, and two cylindrical backup rings 3 and 3A provided with outer cylindrical groove G and G1, respectively, to connect and support a cylindrical bridge spanned by said cylindrical arcuate pieces A1 and A2 when gaskets 8 and 9 are seated around the end portions of said two pipes. The inner radial flanges F1 and F2 of said arcuate pieces are keyed in (i.e. mounted in), inside the radial grooves G and G1 constructed around said backup rings 3 and 3A. Backup rings 3 and 3A, which can slide, are held around the end portions of pipes by means of positioning shoulders 1P and 2P constructed around pipes between shoulders 3L and flat plate arcuates L1 and L2 of backup rings 3 and 3A respectively. The flat plate arcuates L1 and L2 are concentric with the pipe and the radial groove in which they are mounted. The invented coupling also provides Crossable Means for cylindrical couplings, which are attached to circumferential grooves to connect two pipes. The Crossable Means as a unit is defined to include a partitioner ring 12 having at least one or more circumferentially threaded radial hole or holes, so that, at least one arcuate piece concentric with the partitioner ring can be attached to the partitioner ring by means of at least one screw or anchor bolt; and said partitioner ring separates two gaskets, where each gasket is designed to be seated around the end portion of one of the two pipes being connected by means of a coupling, and each gasket is provided with a special backup ring, which has an external circumferential groove and an inner radial flange in its front end portion; and each said backup ring can be attached to the circumferentially constructed shoulder around the end portion of a pipe by positioning said shoulder around the pipe between the inner flange of the backup ring and cylindrical arcuate flat plates mounted inside of the inner radial groove at the outer end of the backup ring.

Figure 1:
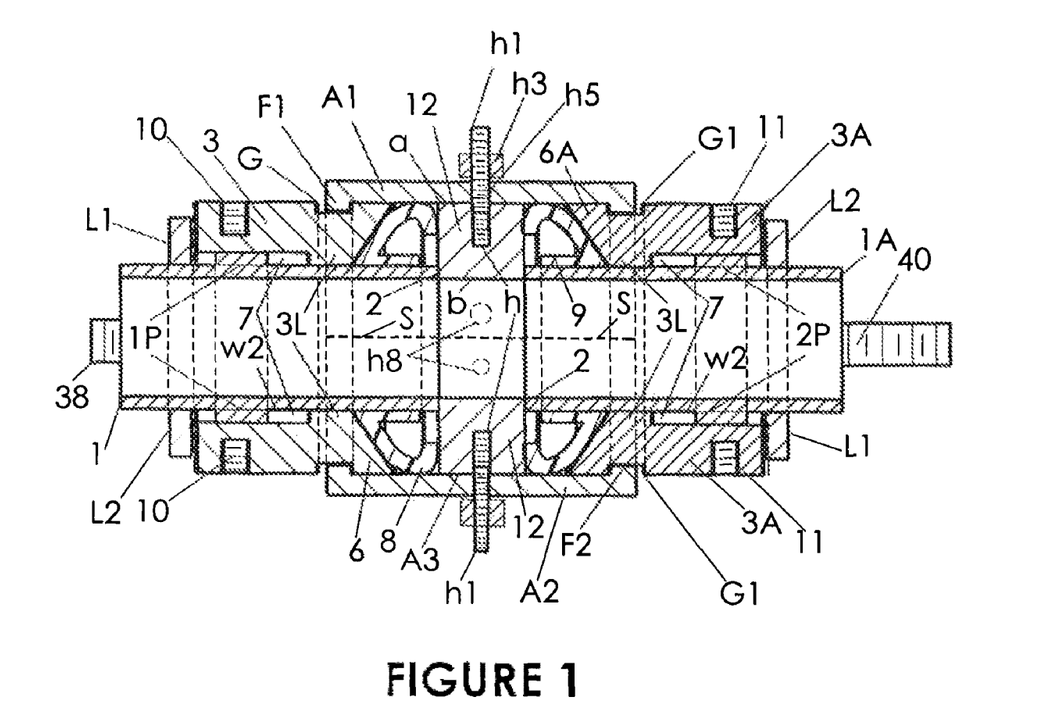
FIG. 1 is a longitudinal vertical section of the invented coupling connecting two pipes.
Figure 4:
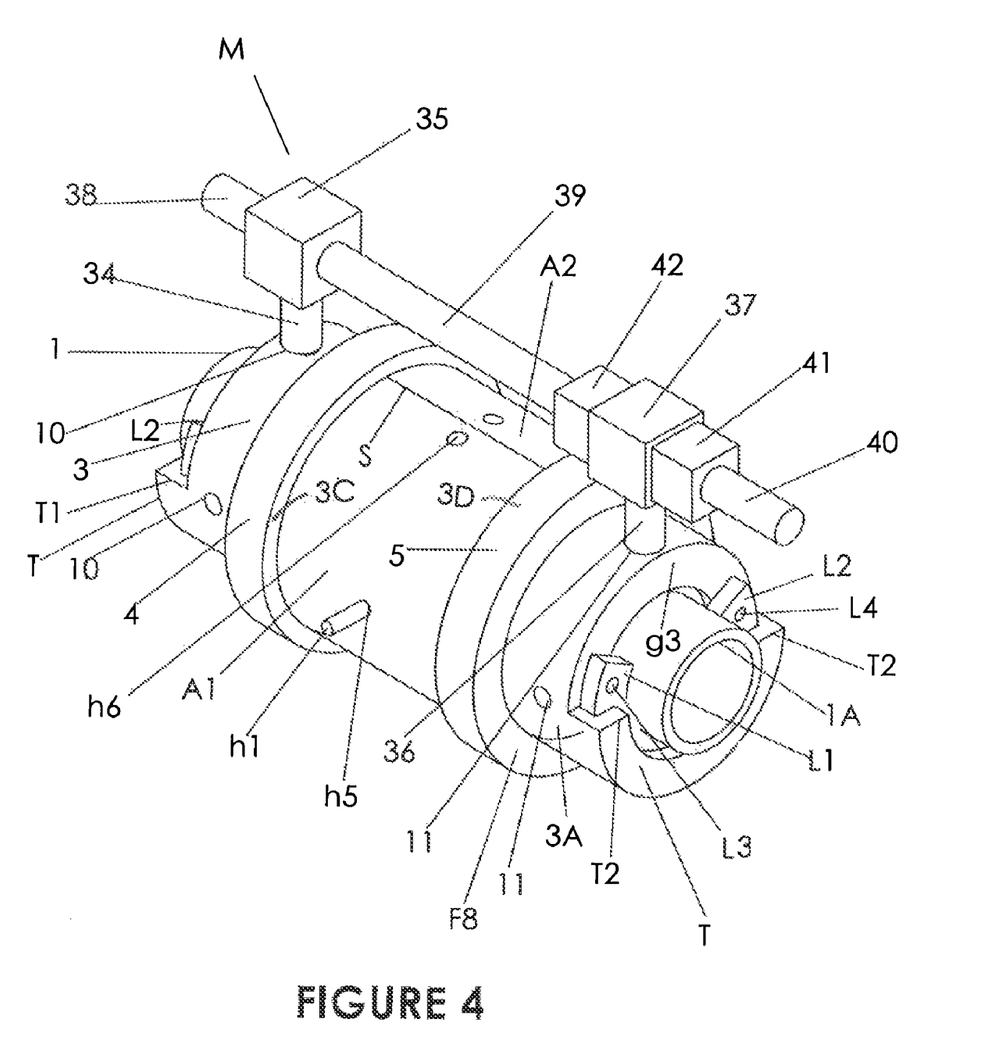
FIG. 4 is a perspective view of the coupling shown with one mechanical adjuster used to adjust the distance between grooves around cylindrical backup rings.

The connecting of two pipes with the coupling is explained hereafter. At least one arcuate piece is held around a partitioner ring by means of a screw or anchor bolt before said partitioner ring is positioned between the ends of two pipes. First, backup rings 3 and 3A are mounted around the end portions of pipes being connected, so that shoulders 1P and 2P are positioned between inner flanges 3L and grooves g2, FIG. 6, of backup rings 3 and 3A respectively. Second, flat arcuate plates L1 and L2 are mounted in each of the grooves g2 and are locked in place by means of driving screws into the outer end of the coupling body. Third, seal gaskets 8 and 9 are mounted around the end portions 2 of pipes 1 and 1A respectively. Fourth, two arcuates held to partitioner ring 12 are positioned around shoulder 6 of backup ring 3. Fifth, mechanical adjuster assembly is mounted over backup rings 3 and 3A and the distance between grooves G and G1 is adjusted properly, so that flanges F1 and F2 of arcuates A1 and A2 can be mounted into grooves G and G1, and the arcuates are tightened around shoulders 6 and 6A by means of nuts h3 and anchor bolts h1. Sixth, in the case of a high fluid pressure pipeline, cylindrical locking rings 4 and 5, FIGS. 1-A, 4, and 6, are provided with inner radial legs, which are positioned around flanges F1 and F2 to prevent them from coming out of grooves G and G1. On both sides of the coupling body, each locking ring 4 and 5 can be held in place by means of at least one bracket, not shown, secured to the backup rings by driving a screw, not shown, through a corresponding opening in the bracket into threaded holes 10 and 11 respectively. The coupling can be provided with more than two arcuates. Couplings and Crossable Means can be manufactured by any suitable engineering materials (where the materials can be more than one type) by casting or machining or fabricating. Seal gaskets can be manufactured by any conventional method.

THE DRAWINGS

The best mode presently contemplated for carrying out the invention is illustrated in the accompanying drawings, in which:

FIG. 1-A is the same FIG., but it is provided with two cylindrical locking rings for the cylindrical arcuates, where each locking ring is provided an inner leg (inner flange);

FIG. 3-A is the same perspective view of two cylindrical arcuate pieces of coupling shown in FIG. 1, but the peripheral area opposite to the inner flanges of each arcuate is raised beyond the outer diameter of the arcuate;

DETAILED DESCRIPTION OF THE ILLUSTRATED EMBODIMENT

The drawings are not drawn to any particular scale. Once the repetitive elements of the coupling have been explained once, they will not be explained again, unless needed. The elements on two sides of the partitioner ring 12 are mirror views of each other, therefore, they are assigned the same numerals and letters on both sides in the same FIG. Some hidden lines of some elements, and threads in holes and threads on bolt stems, may not be shown, when reference to them makes them obvious. All FIGS. can be studied together.

Figure 2:
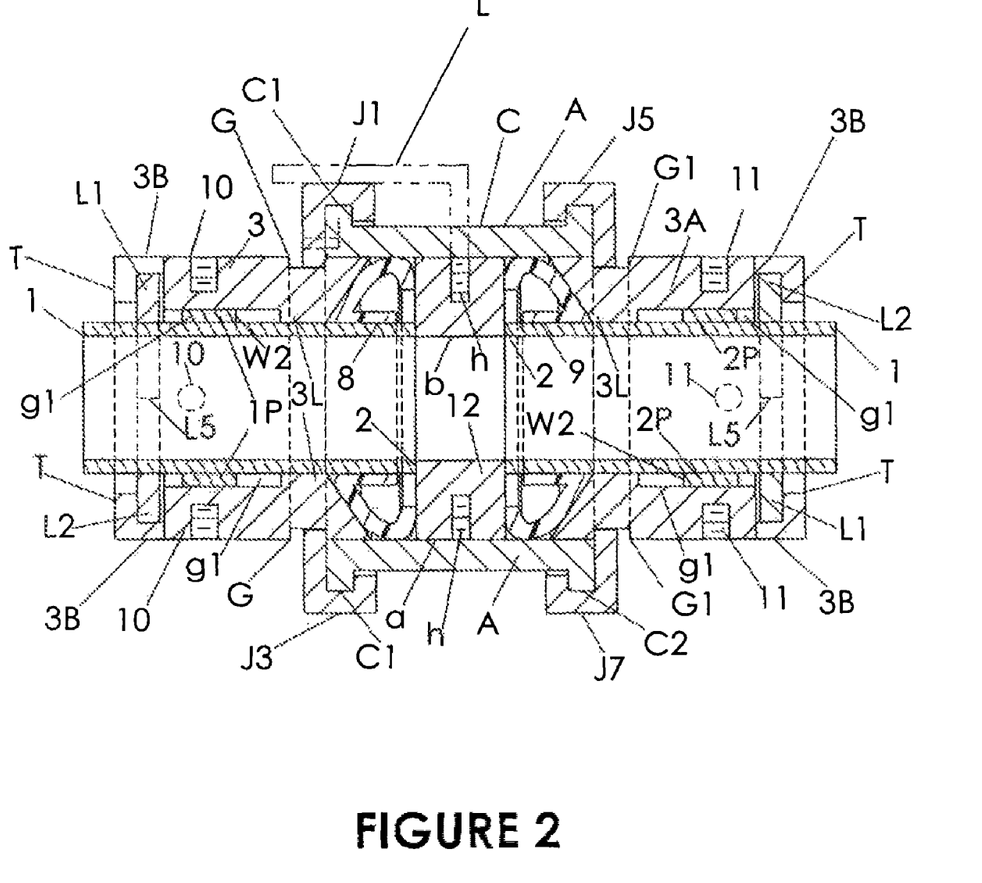
FIG. 2 is a longitudinal vertical section of a different type of cylindrical coupling mounted around and attached to Crossable Means connecting two pipes.
Figure 3:
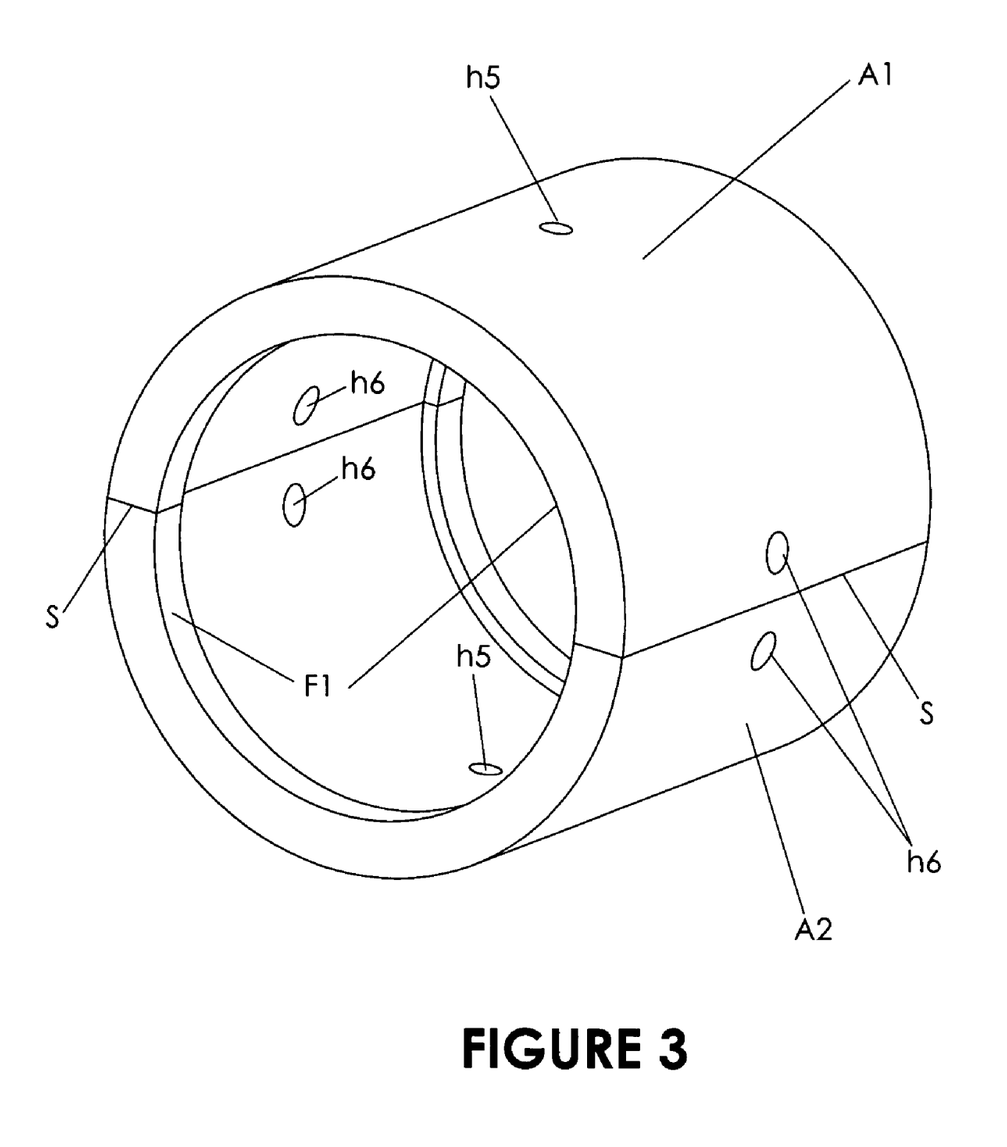
FIG. 3 is a perspective view of two cylindrical arcuate pieces of coupling shown in FIG. 1.
Figure 6:
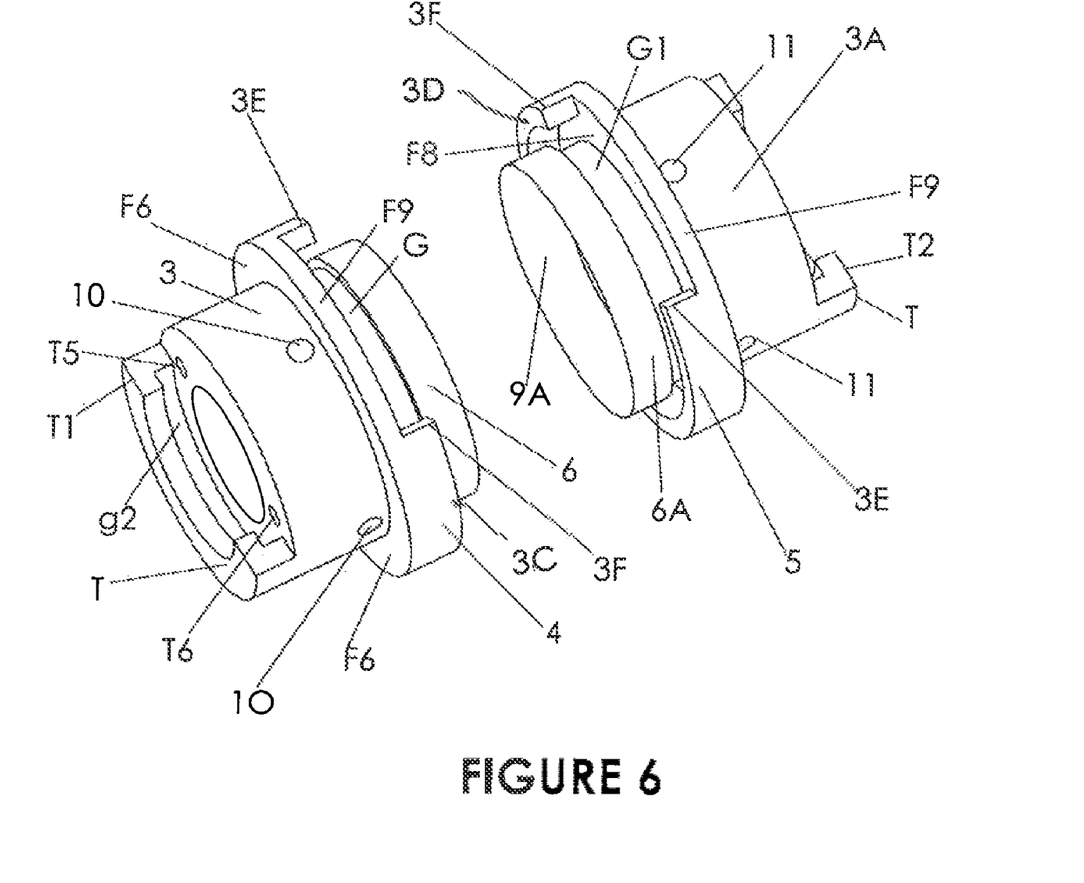
FIG. 6 is a perspective view of cylindrical opposite backup rings, where, through cuts in the cylindrical portions of two opposite backup rings, the relative positions of locking cylindrical rings with respect to shoulders and grooves provided around the backup rings are shown.

As shown in FIG. 1, the invention may take the form of a coupling for joining the ends of two pipes 1 and 1A in end-to end relationship, where the inner end of each pipe adjacent to partitioner ring 12 is depicted by 2. First, cylindrical backup rings 3 and 3A, shown in FIGS. 1, 2, 4, and 6, are mounted around the end portions of pipes being connected; and said backup rings are mounted in a manner such that shoulders 1P and 2P, constructed around the pipes, are positioned between inner flanges 3L and grooves g2, FIG. 6, of backup rings 3 and 3A respectively, then flat plate arcuates L1 and L2, shown in FIG. 4, are mounted into grooves g2, and are fasten by screws driven through openings L3 and L4, FIG. 4, into corresponding threaded holes T5 and T6, FIG. 6, of backup rings 3 and 3A shown in FIG. 6. Flat plate arcuates are concentric to the pipe and are locked inside of groove g2, where groove g2 is shown in FIGS. 2 and 6. The arcuates L1 and L2 are preferably made from rigid material. Shoulders 1P and 2P are preferably constructed by welding concentric shoulder rings around the pipes or they can be constructed when the pipe is produced. Then gaskets 8 and 9 are seated around the end portions of pipes as shown in FIGS. 1 to 3.

Hereafter, the mounting of the outer body of coupling, which is made of at least two arcuate pieces A1 and A2 begins. Arcuate pieces A1 and A2 are held loosely around partitioner ring 12 by means of screws or anchor bolts indicated by threaded stems h1 and nuts h3, where h1 have already been driven into centrally located threaded holes h in partitioner ring 12, through openings h5 provided in arcuates A1 and A2. Stems h1 can also be welded by positioning them in holes in ring 12. The outer and inner diameters of the partitioner ring 12 are indicated by a and b. At least one bolt or screw h1 is provided per arcuate. For very low fluid pressure in the pipeline, one anchor bolt h1 or one screw per arcuate may be sufficient, but for higher fluid pressure in the pipeline, screws can also be driven into holes h8 provided in partitioner ring 12, by passing them through corresponding openings h6 provided in arcuates A1 and A2 which openings are shown in FIGS. 3, 3-A and 4. Instead of circular openings, the openings h6 can be rectangular openings where the length of each opening is aligned with the circumferential length of the arcuate. The inner surfaces of arcuates in contact with partitioner ring 12 are indicated by A3. First, flange F1 of arcuate A1 is positioned over shoulder 6 of ring 3, and at the same time, receded flange F1 of arcuate A2 from ring 12 is positioned around shoulder 6. Then flanges F2 of arcuates A1 and A2 are positioned over shoulders 6A. Then, posts 34 and 36 with heads 35 and 37 (of mechanical adjuster assembly M shown in FIG. 4) are driven into threaded openings 10 and 11, and bolt 39 with nuts 41 and 42 is mounted through the threaded opening in head 35, and also through the unthreaded opening provided in head 37. The locations of openings 10 and 11 in backup rings 3 and 3A are predetermined. Then the distance between head 35 and nut 42 is fixed as required, and pipe 1A is pushed toward the other pipe until head 37 meets the nut 42 and stops. Thereafter, flanges F1 and F2 are positioned around grooves G and G1 and nuts h3 around stems h1 are tightened to fix the arcuates A1 and A2 in place. For small size pipes, one primary mechanical adjuster M will be sufficient, but for larger sizes of pipes more than one mechanical adjuster assembly M will be needed and the number of secondary assemblies M will depend on the size of the pipes. The meeting line between two arcuates A1 and A2 is indicated by dotted line S. The slanting surface of each backup rings 3 and 3A, which backs up the slanting back of the seal gasket, is indicated by 9A in FIG. 6. For high pressure lines, couplings will preferably be provided with four or more arcuates to cut the pressure load on each arcuate and each bolt. In FIGS. 1 to 3 both ends 2 of pipes are shown in contact with the partitioner ring 12, and in which it is understood that the pipes are installed in shrinkage mode, where pipes after installing are expected to shrink due to temperature changes. If, after installing them, the pipes are expected to expand, then shoulders 1P and 2P will be touching the flat arcuate plates L1 and L2, and ends 2 of the pipes will be pulled away from partitioner ring 12 correspondingly. In FIGS. 1 to 5 (except for FIG. 2) meeting ends of arcuates are depicted by lines S. The sections of pipes which are welded to the ends of shoulders 1P and 2P are indicated by W2, with the weld not shown. Opposite threaded ends of bolt 39, shown in FIG. 4, are depicted by 38 and 40 in FIG. 1. Outer ends of backup rings 3 and 3A are indicated by T.

FIG. 1-A is the same FIG. as FIG. 1, except that the coupling in FIG. 1-A is provided with cylindrical locking rings 4 and 5 which have outer legs 3C and 3D (shown in FIGS. 4 and 6) respectively. The inner leg of ring 4 is indicated by F6 and the inner leg of ring 5 is indicated by F8. The rings 4 and 5 are used with couplings when there is high fluid pressure in the pipeline or where seismic loads or environmental high vibrations make their use necessary. In some cases only one ring may be sufficient. Rings 4 and 5 prevent flanges F1 and F2 from coming out of grooves G and G1. On both sides of the coupling body, each locking ring 4 and 5 can be held in place by means of at least one bracket, not shown, secured to the backup rings by driving screws, not shown, through corresponding openings in the brackets into threaded holes 10 and 11 respectively.

FIG. 2 shows a cylindrical coupling similar to that patented by the inventor under U.S. Pat. Nos. 5,387,017 and 6,921,115 that can be used with the crossable means of the current invention. FIG. 2 shows in phantom at least one angle screw bar L which is used to attach the cylindrical coupling to the partitioner ring 12 when a seal gasket needs replacing or when the coupling is connected to pipes for the first time during construction of a pipeline. Additional T bars (not shown) can also be used by mounting radial stems into holes h8 shown in FIG. 1. Thus, it is clear from FIG. 1 that various cylindrical couplings which require groove means to connect two pipes, can be used with the invented Crossable Means. The locations of threaded holes 10 and 11 are predetermined so that they can be used to the advantage of the crossover coupling. Thus, in FIG. 2, threaded holes 10 and 11 can be located adjacent to the grooves G and G1, and a short arcuate bracket with an inner leg can be used to lock rotatable camming jaws J1, J3, J5 and J7 of cylindrical coupling C in FIG. 2. In FIG. 2 the coupling is provided with four jaws in a set, on each side of the coupling, mounted around flanges C1 and C2, though the coupling can have less than four jaws or more than four jaws. The outer cylindrical walls of grooves g2 in FIG. 6 are indicated by 3B in FIG. 2. The meeting of flat plate arcuates L1 and L2 shown in FIGS. 2 and 4 are indicated by L5 in FIG. 2. The rest of FIG. 2 Crossable Means has been explained earlier.

FIG. 3 is a perspective view of two cylindrical arcuate pieces of coupling shown in FIG. 1. Short brackets, not shown, can also be used to connect openings h6 in arcuates A1 and A2 and threaded holes h8 in partitioner ring 12. The arcuate pieces A1 and A2 were explained earlier along with FIG. 1.

FIG. 3-A is the same FIG. as FIG. 3 except that, opposite to inner flanges F1 and F2, the outer surface is raised as flanges F3 and F4 to provide extra strength to the ends of the arcuates. The arcuates shown in FIG. 3-A can be used with or without locking rings.

FIG. 4 is a longitudinal view of the coupling shown with primary mechanical adjuster assembly M means used for aligning backup rings 3 and 3A and adjusting the distance between the grooves constructed around them. The assembly M is made of two posts 34 and 36, which have screw threads in their feet, so that they can be screwed into threaded openings 10 and 11 in backup rings 3 and 3A. The assembly M is provided with threaded guide bolt 39 with nuts 41 and 42, where bolt 39 runs parallel to the axis of pipes and is driven through the internally threaded post head 35, and it slides through post head 37 of posts 36. In large size pipes three assembly M will preferably be used, where two secondary side assemblies M will preferably be located at 90 degree angles with respect to the primary assembly M shown in FIG. 4. In small size pipes, it may not be necessary to use nuts 41 with guide bolt 39 of two secondary mechanical adjuster assemblies M. Locking rings are shown by 4 and 5. On the right side of FIG. 4, the inner leg of the locking ring 5 is shown is indicated by F8. Also, radial inner legs F6 and F8 of locking rings 4 and 5 are shown in FIG. 6. The rest of FIG. 4 was explained earlier.

Figure 5:
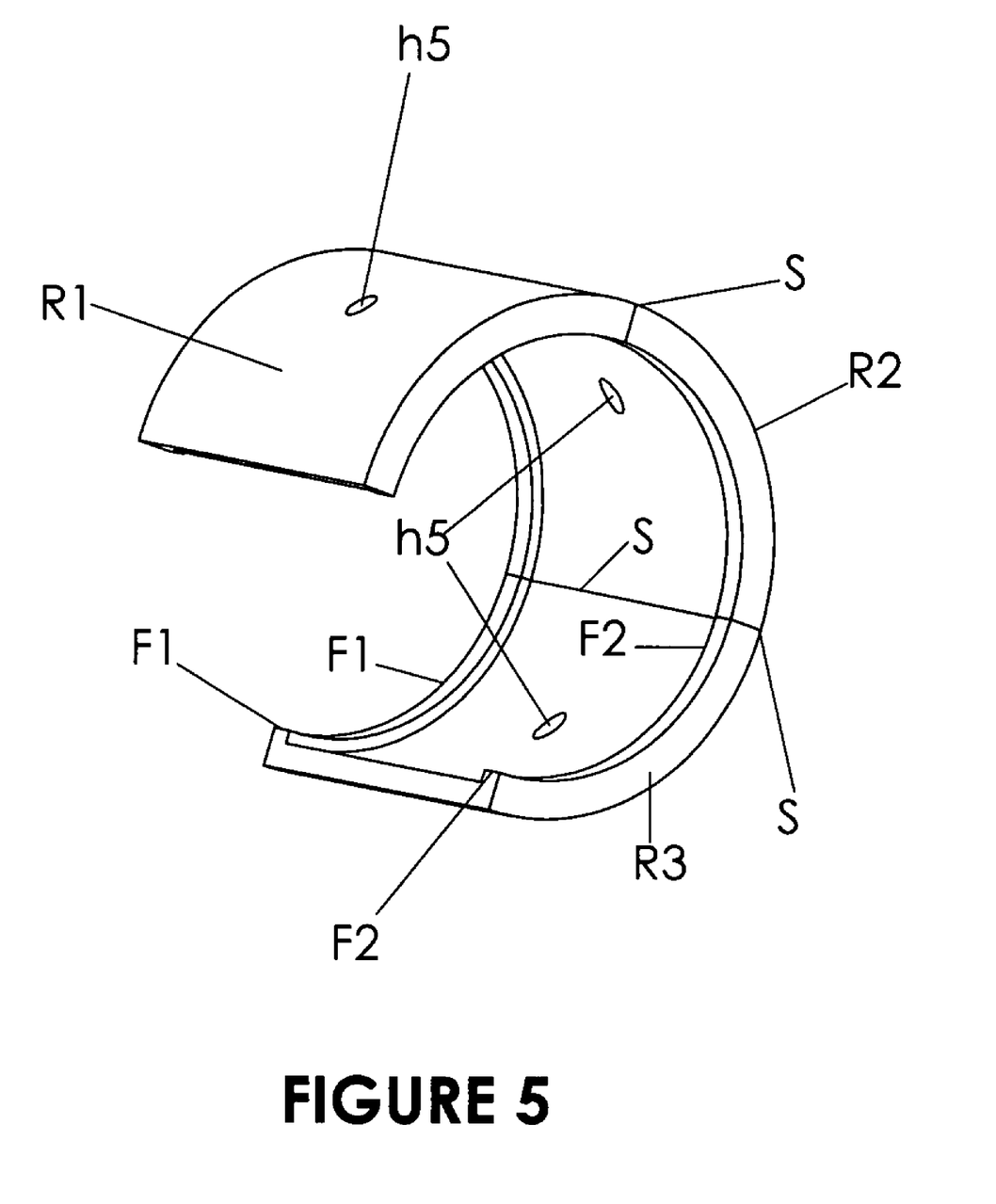
FIG. 5 is a perspective view of three cylindrical arcuates out of a set of four arcuates, where the fourth arcuate is not shown.

FIG. 5 shows the arrangement of three cylindrical arcuate R1, R2 and R3, where the fourth arcuate is not shown. Inner flanges are shown by F1 and F2, and the meeting of ends of arcuates are indicated by lines S, and centrally located openings in the arcuates are indicated by h5.

FIG. 6 is a perspective view of cylindrical opposite backup rings 3 and 3A. Cuts 3E and 3F through cylindrical sections F9 (of locking rings 4 and 5) expose the relative positions of radial inner legs F6 and F8 of said locking rings with respect to shoulders 6 and 6A and grooves G and G1 provided around backup rings 3 and 3A. The outer end of each backup ring 3 and 3A is indicated by T, which is the outer wall of groove g2. Open cuts of the grooves g2 are indicated by T1 and T2 respectively for backup rings 3 and 3A. Each groove g2 is used to mount flat plate arcuates L1 and L2, which are shown in FIG. 4, to prevent the pulling out of shoulders 1P and 2P, from the coupling. Flat plates L1 and L2 are held in groove g2 by driving screws through opening L2 and L4 (shown in FIG. 4) into corresponding holes T5 and T6 provided in backup rings 3 and 3A.

Figure 7:
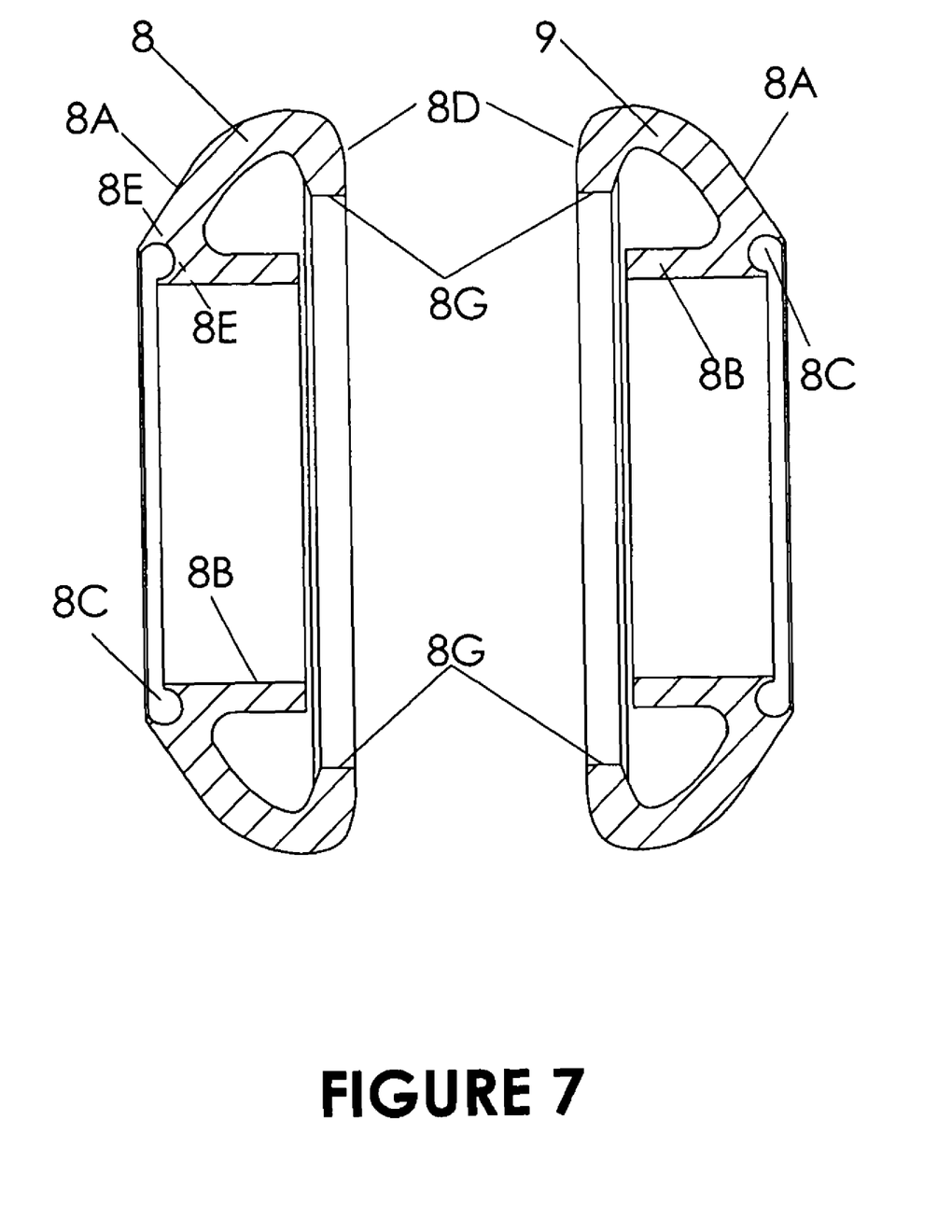
FIG. 7 is a longitudinal vertical section of an alternate seal gasket.

FIG. 7 is a longitudinal vertical section of opposite seal gaskets 8 and 9 with alternate design. Seal gaskets are the same as shown in FIGS. 1 to 2, but ends 8D are shown in relaxed preinstalled mode, and they are each provided with a circular section 8C in the toe of each gasket, for mounting spiral spring wire, like the strings of the piano, for backup support. Circular section 8C in the toe of the gasket seal may be a linear section as indicated by phantom line 8E-8E. Thus, backup support for the toe of the seal will be located outside the toe of the gasket. The inner leg of each gasket, which is seated around the pipe end portion is indicated by 8B. Inner slant 9A of backup rings 3 and 3A (shown in FIG. 6), which touches the slanting back of each gasket, is indicated by 8A. End 8G of each seal gasket can be designed to assume any radius in its installed mode, but it will never assume a radius less than the radius b of partitioner 12.

Whereas this invention is here illustrated and described with reference to embodiments thereof that are presently contemplated as being the best mode of carrying out such invention in actual practice, it is to be understood that various changes may be made in adapting the invention to different embodiments without departing from the broader inventive concepts disclosed herein and comprehended by the claims that follow.

I claim:

1. A crossable means for a coupling to connect ends of two pipes, each pipe having a pipe end, a pipe end portion, and a pipe circumferential shoulder around the pipe in the pipe end portion, comprising:
    a partitioner ring adapted to be positioned between the ends of the two pipes to be joined;
    backup rings each having a backup ring front portion, a backup ring outer portion, a backup ring external circumferential groove, and a backup ring inner radial flange in the backup ring front portion, the backup ring inner radial flange sized to receive therethrough the end portion of the pipe with the backup ring inner radial flange toward the end of the pipe from the pipe circumferential shoulder;
    a gasket around the end portion of each pipe between the end of the pipe and the backup ring, said gasket adapted to seal between the pipe and the front portion of the backup ring; and
    a mounting for attaching at least one arcuate member to the partitioner ring and tightening the at least one arcuate member against the crossable means, wherein the at least one arcuate member includes inwardly extending flanges and wherein, when the at least one arcuate members is tightened against the crossable means, the at least one arcuate member inwardly extending flanges extend into the respective backup ring external circumferential grooves to secure the backup rings and pipe ends together with the partitioner ring between the pipe ends.

2. A crossable means for a coupling to connect ends of two pipes according to claim 1, wherein the mounting includes at least one circumferentially threaded radial hole in the partitioner ring, and at least one anchor bolt extending thereinto.

3. A crossable means for a coupling to connect ends of two pipes according to claim 2, wherein the at least one anchor bolt extending into the threaded radial hole in the partitioner ring includes a threaded anchor bolt shaft extending from the partitioner ring and a nut threadedly received on anchor bolt shaft.

4. A crossable means for a coupling to connect ends of two pipes according to claim 3, wherein each backup ring additionally includes a backup ring inner radial groove in the backup ring outer portion, and an arcuate flat plate adapted to fit into the backup ring inner radial groove to extend from the backup ring inner radial groove toward the pipe end portion when received in the backup ring to form a slideway for the pipe circumferential shoulder between the backup ring inner radial flange and the arcuate flat plate.

5. A crossable means for a coupling to connect ends of two pipes according to claim 4, wherein the backup ring inner radial groove opens to outside the backup ring to facilitate removable insertion of the arcuate flat plate into the backup ring inner radial groove.

6. A crossable means for a coupling to connect ends of two pipes according to claim 1, wherein each backup ring additionally includes a stop in the backup ring outer portion to extend from the backup ring toward the pipe end portion when received in the backup ring to form a slideway for the pipe circumferential shoulder between the backup ring inner radial flange and the stop.

7. A crossable means for a coupling to connect ends of two pipes according to claim 6, wherein the stop in each backup ring outer portion includes a backup ring inner radial groove in the backup ring outer portion, and an arcuate flat plate adapted to fit into the backup ring inner radial groove to extend from the backup ring inner radial groove toward the pipe end portion when received in the backup ring to form the slideway for the pipe circumferential shoulder between the backup ring inner radial flange and the arcuate flat plate.

8. A crossable means for a coupling to connect ends of two pipes according to claim 7, wherein the backup ring inner radial groove opens to outside the backup ring to facilitate removable insertion of the arcuate flat plate into the backup ring inner radial groove.

9. A coupling to connect ends of two pipes, each pipe having a pipe end, a pipe end portion, and a pipe circumferential shoulder around the pipe in the pipe end portion, comprising:
    crossable means, said crossable means comprising:
        a partitioner ring adapted to be positioned between the ends of the two pipes to be joined;
        backup rings each having a backup ring front portion, a backup ring outer portion, a backup ring external circumferential groove, and a backup ring inner radial flange in the backup ring front portion, the backup ring inner radial flange sized to receive therethrough the end portion of the pipe with the backup ring inner radial flange toward the end of the pipe from the pipe circumferential shoulder;

a gasket around the end portion of each pipe between the end of the pipe and the backup ring, said gasket adapted to seal between the pipe and the front portion of the backup ring; and a mounting for attaching at least one arcuate member to the partitioner ring and tightening the at least one arcuate member against the crossable means, wherein the at least one arcuate member includes inwardly extending flanges and wherein, when the at least one arcuate members is tightened against the crossable means, the at least one arcuate member inwardly extending flanges extend into the respective backup ring external circumferential grooves to secure the backup rings and pipe ends together with the partitioner ring between the pipe ends; and at least one arcuate member which can be attached to and tightened against said crossable means by the mounting.

10. A coupling to connect ends of two pipes according to claim 9, wherein the at least one arcuate member which can be attached to said crossable means by the mounting is at least two arcuate members adapted to form a cylinder when attached to the crossable means.

11. A coupling to connect ends of two pipes according to claim 10, additionally including at least one cylindrical locking ring cooperable with the at least two arcuate members when attached to the crossable means to lock the at least two arcuate members in the form of a cylinder around the crossable means.

12. A coupling to connect ends of two pipes according to claim 11, wherein the cylinder formed around the crossable means by the at least two arcuate members when attached to the crossable means has opposite end portions and wherein the at least one locking ring is two locking rings each adapted to extend around an opposite end portion of the cylinder.

13. A coupling to connect ends of two pipes according to claim 9, wherein each gasket extends between the partitioner means and the front portion of the respective backup ring to seal against the partitioner means, the front portion of the respective backup ring, and the at least one arcuate member.

14. A coupling to connect ends of two pipes according to claim 9, wherein the mounting includes at least one circumferentially threaded radial hole in the partitioner ring, and at least one anchor bolt extending thereinto.

15. A coupling to connect ends of two pipes according to claim 14, wherein the at least one anchor bolt extending into the threaded radial hole in the partitioner ring includes a threaded anchor bolt shaft extending from the partitioner ring and a nut threadedly received on anchor bolt shaft.

16. A coupling to connect ends of two pipes according to claim 15, wherein each backup ring additionally includes a backup ring inner radial groove in the backup ring outer portion, and an arcuate flat plate adapted to fit into the backup ring inner radial groove to extend from the backup ring inner radial groove toward the pipe end portion when received in the backup ring to form a slideway for the pipe circumferential shoulder between the backup ring inner radial flange and the arcuate flat plate.

17. A coupling to connect ends of two pipes according to claim 16, wherein the backup ring inner radial groove opens to outside the backup ring to facilitate removable insertion of the arcuate flat plate into the backup ring inner radial groove.

18. A coupling to connect ends of two pipes according to claim 9, wherein each backup ring additionally includes a stop in the backup ring outer portion to extend from the backup ring toward the pipe end portion when received in the backup ring to form a slideway for the pipe circumferential shoulder between the backup ring inner radial flange and the stop.

19. A coupling to connect ends of two pipes according to claim 18, wherein the stop in each backup ring outer portion includes a backup ring inner radial groove in the backup ring outer portion, and an arcuate flat plate adapted to fit into the backup ring inner radial groove to extend from the backup ring inner radial groove toward the pipe end portion when received in the backup ring to form the slideway for the pipe circumferential shoulder between the backup ring inner radial flange and the arcuate flat plate.

20. A coupling to connect ends of two pipes according to claim 19, wherein the backup ring inner radial groove opens to outside the backup ring to facilitate removable insertion of the arcuate flat plate into the backup ring inner radial groove.

21. A coupling to connect ends of two pipes, each pipe having a pipe end, a pipe end portion, and a pipe circumferential shoulder around the pipe in the pipe end portion, comprising:

crossable means, said crossable means comprising:
a partitioner ring adapted to be positioned between the ends of the two pipes to be joined;

two backup rings, each backup ring having a backup ring front portion, a backup ring outer portion, a backup ring external circumferential groove, and a backup ring inner radial flange in the backup ring front portion, the backup ring inner radial flange sized to receive therethrough the end portion of one of the pipes to be connected with the backup ring inner radial flange toward the end of the pipe from the pipe circumferential shoulder;

two gaskets, each gasket adapted to be positioned around the end portion of one of the pipes to be connected between the end of the pipe and the backup ring, said gasket adapted to seal between the pipe and the front portion of the backup ring; and a mounting adapted to attach coupling means to the partitioner ring, wherein the coupling means is adapted to be positioned over the crossable means and wherein the coupling means includes inwardly extending flanges adapted to be extended into respective backup ring external circumferential grooves when the coupling means is positioned over the crossable means to secure the backup rings and the pipe ends together with the partitioner ring between the pipe ends; and coupling means adapted to be positioned over the crossable means and including inwardly extending flanges adapted to be extended into the respective external circumferential grooves of the backup rings to secure the backup rings together with the partitioner ring and gaskets therebetween.

22. A coupling to connect ends of two pipes according to claim 21, wherein each backup ring additionally includes a stop in the backup ring outer portion to extend radially from the backup ring toward the pipe end portion when received in the backup ring to form a slideway for the pipe circumferential shoulder between the backup ring inner radial flange and the stop.

23. A coupling to connect ends of two pipes according to claim 22, wherein the stop in each backup ring outer portion includes a backup ring inner radial groove in the backup ring outer portion, and an arcuate flat plate adapted to fit into the backup ring inner radial groove to extend from the backup ring inner radial groove radially toward the pipe end, portion when received in the backup ring to form the slideway for the pipe circumferential shoulder between the backup ring inner radial flange and the arcuate flat plate.

24. A coupling to connect ends of two pipes according to claim 23, wherein the backup ring inner radial groove opens to outside the backup ring to facilitate removable insertion of the arcuate flat plate into the backup ring inner radial groove.

25. A coupling to connect ends of two pipes, each pipe having a pipe end, a pipe end portion, and a pipe circumferential shoulder around the pipe in the pipe end portion, comprising:

crossable means, said crossable means comprising:

a partitioner ring adapted to be positioned between the ends of the two pipes to be joined;

two backup rings, each backup ring adapted to receive therethrough the end portion of one of the pipes to be connected, each backup ring having a backup ring front portion, a backup ring outer portion, a backup ring external circumferential groove, and an inner stop in the backup ring outer portion to extend radially from the backup ring toward the pipe end portion when received in the backup ring and positioned beyond the pipe circumferential shoulder from the pipe end to form a stop for the pipe circumferential shoulder to prevent the end of the pipe from separating from the backup ring;

two gaskets, each gasket adapted to be positioned around the end portion of one of the pipes to be connected between the end of the pipe and the backup ring, said gasket adapted to seal between the pipe and the front portion of the backup ring; and a mounting adapted to attach coupling means to the partitioner ring, wherein the coupling means is adapted to be positioned over the crossable means and wherein the coupling means includes inwardly extending flanges adapted to be extended into respective backup ring external circumferential grooves when the coupling means is positioned over the crossable means to secure the backup rings and the pipe ends together with the partitioner ring between the pipe ends; and coupling means adapted to be positioned over the crossable means and including inwardly extending flanges that can be extended into the respective external circumferential grooves of the backup rings to secure the backup rings together with the partitioner ring and gaskets therebetween.

* * * * *